Patented May 25, 1948

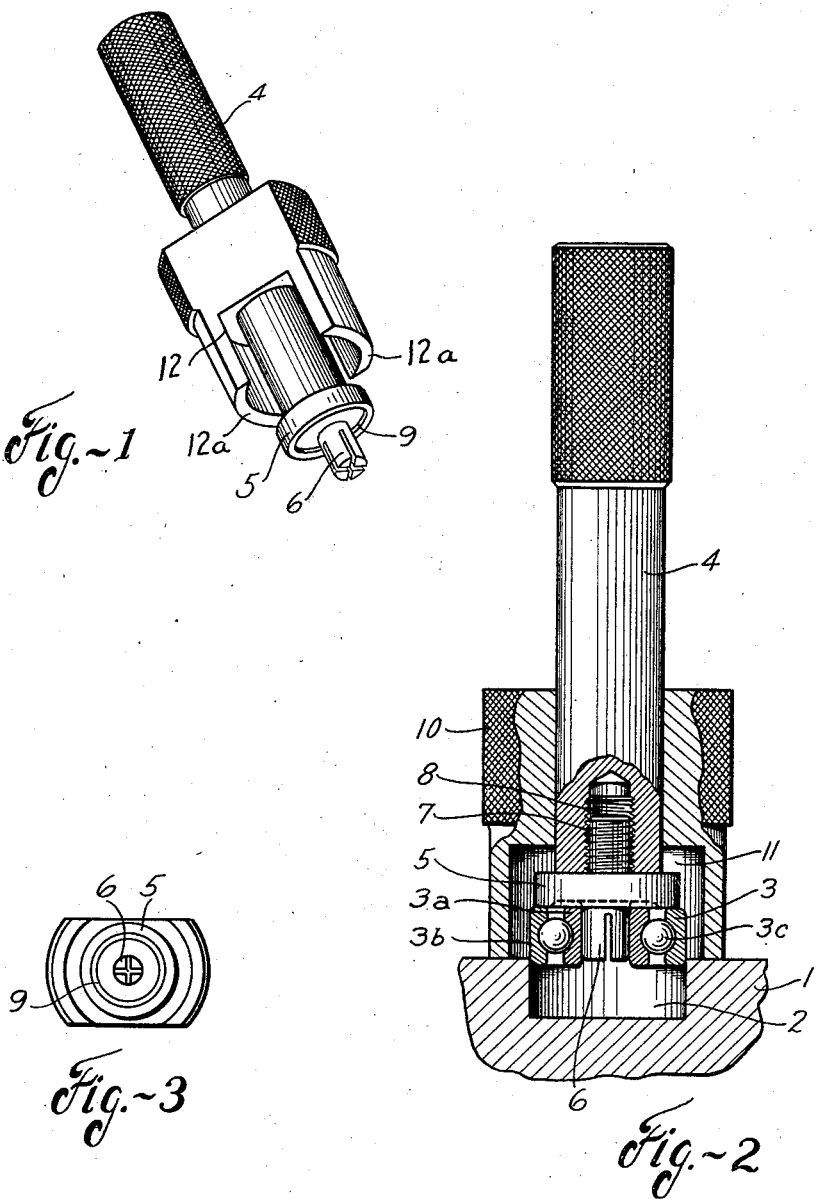

2,441,981

UNITED STATES PATENT OFFICE 2,441,981

BEARING DRIVER

Earl E. Stelzer, Springfield, Ohio, assignor to The Parker Pattern and Foundry Company, Springfield, Ohio, a corporation of Ohio Application November 1, 1943, Serial No. 508,506

4 Claims. (Cl. 29—275)

This invention relates to percussion tools and more particularly to a driver or set for assembling bearing units, bushings and the like in a support or mount.

Ordinarily antifriction bearing units and bushings are seated in sockets or recesses in a supporting structure with a tight driving fit. It is highly desirable that the bearing be inserted in exact predetermined axial alignment or with its plane parallel to that of the support.

The object of the present invention is to improve the construction as well as the means and mode of operation of bearing and bushing driving tools whereby they may not only be of simple structure and capable of being economically manufactured, but will be efficient in use, accurate and uniform in operation, have few parts and be unlikely to get out of repair.

A further object of the invention is to provide a bearing driving instrument which is readily adaptable to bearings of different size and to provide a guide therefor by which alignment of the bearing in its setting is assured.

A further object of the invention is to provide a bearing or bushing assembling instrument having the advantageous structural features and inherent meritorious characteristics and mode of operation herein set forth.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings wherein is shown the preferred, but obviously not necessarily the only form embodiment of the invention, Fig. 1 is a perspective view of an assembled bearing or bushing driver embodying the present invention.

Fig. 2 is a side elevation, partly in section of the bearing driver applied to a bearing being driven into a support.

Fig. 3 is an end elevation of the driver.

Like parts are indicated by similar characters of reference throughout the several views.

Referring to the drawings, I indicates a bearing support, which may be a machine part or other structure having therein a recess or socket 2 into which a bearing unit 3 is to be inserted with a tight drive fit. The bearing illustrated is of the antifriction ball type comprising inner and outer races 3a and 3b and intermediate bearing ball 3c. However the instrument is not limited to insertion of ball bearings, but may be applied to other types of bearings and to plain bushings.

The tool comprises a plunger 4 having at one end a concave disc like head 5 from which projects axially with the plunger a pilot stud 6 insertable in the central shaft opening of the bearing or bushing. The pilot stud 6 centers the driving plunger relative to the bearing and prevents any side slip or off center driving influence. The rim of the concave disc 5 agrees with and bears upon the outer race 3b of the bearing unit. The concavity of the disc afford clearance to relieve the inner race 3a and bearing balls from impact or pressure. For other types of bearings a flat disc may be employed in lieu of the concave disc.

The head 5 and stud 6 may be formed integrally with the plunger 4. However the head is preferably one of a plurality of such heads of different diameter, or of different face contours or having studs 6 of different sizes, which may be substituted one for another to agree with the size and design of different bearings to be inserted. To such end the contact head 5 is formed with a screw stud 7 at its side opposite the pilot stud 6, which is engageable in a screw threaded bore 8 in the end of the plunger.

The outer face of the head 5 is concave as at 9, so that the impact or pressure is delivered by the plunger only to the outer race 3b of the bearing unit, which is the only portion having close frictional engagement within the recess or socket 2.

It being highly desirable that a bearing or bushing be driven to its seat in position with its axis properly aligned, or with the face of the bearing in a proper plane, a guide block 10 is provided, in which the plunger 4 is mounted for free axial movement. The guide block is provided with a recess 11 of sufficient diameter and depth to initially receive therein a bearing or bushing to be seated of maximum size. The recessed face of the guide block is in a plane perpendicular to the axis of the plunger. Consequently when the guide block 10 is positioned against the face of the support 1 about the recess 2, the plunger is supported in perpendicular relation to the face of the support and the plane of the bearing being seated. The plunger is free in the block for to and fro longitudinal movement.

The bearing is positioned over the recess or socket 2 and the guide block 10 is positioned over the bearing with the pilot stud 6 of the plunger head 5 engaged in the central opening of the bearing. In such initial position, the bearing 3 is enclosed in the recess 11 of the guide block. The upper end of the plunger is then tapped with a hammer sufficiently hard to drive the bearing into the recess, within which it is made to fit tightly. In order that the progress of the bearing into the recess or socket may be observed, the guide block is preferably, but not necessarily cut away at one or both sides to afford an open space 12 through which the bearing 3 may be observed. When both sides are so cut away there results a construction wherein the guide member 10 is supported on spaced projections 12a. Nevertheless it supports the driving plunger perpendicular to the plane of the face of the bushing and impact of the hammer blows is delivered to the outer support engaging race 3b.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A bearing or bushing driver for forceably inserting a unit into a socket or recess in a mount, including a plunger, a detachable head upon the plunger comprising a concave disc, a pilot stud projecting therefrom, and a recessed guide member through which the plunger is freely axially adjustable, the recessed face of the guide member being in a plane perpendicular to the axis of the plunger and engageable with the mount about the socket or recess into which the unit is to be driven to maintain the plunger and the direction of application of force perpendicular to the plane of the unit.

2. A bearing driver, comprising a reciprocatory plunger to receive impact blows, a guide member in which the plunger is mounted for free axial motion, a head upon the plunger the face of which is concave, a pilot stud projecting centrally from the concave face of the head, and a screw carried by the head on its side opposite the pilot stud, engageable in a screw threaded bore in the end of the plunger.

3. As an article of manufacture, a head for a bearing driver comprising a concave disc the rim of which agrees with and is adapted to bear upon the rim of a bearing unit while the concave area thereof relieves the central portion of the bearing from impact and pressure, a pilot stud projecting centrally from the concave face of the disc, and a screw stud projecting from the side of the disc opposite the pilot stud, for engagement with a driving plunger.

4. A bearing driver, comprising a plunger to receive impact blows, a supporting guide member engageable with a mounting for the bearing in which the plunger is mounted for free axial motion, a head upon the plunger the face of which is concave, and a pilot stud projecting centrally from the concave face of the head upon which a bearing to be driven is located.

EARL E. STELZER.

REFERENCES CITED

The following references are of record in the file of this patent:

UNITED STATES PATENTS

| Number | Name | Date |
|---|---|---|
| 278,612 | Sharp | May 29, 1883 |
| 292,521 | Webster | Jan. 29, 1884 |
| 524,326 | Higgins | Aug. 14, 1894 |
| 663,124 | Kimman | Dec. 4, 1900 |
| 1,069,539 | Evans | Aug. 5, 1913 |
| 1,280,233 | Jones | Oct. 1, 1918 |
| 1,395,587 | McLachlan | Nov. 1, 1921 |
| 1,704,442 | Parkinson | Mar. 5, 1929 |
| 1,740,590 | Hartman | Dec. 24, 1929 |
| 2,038,124 | Osborne | Apr. 21, 1936 |
| 2,279,649 | White et al. | Apr. 14, 1942 |